July 26, 1960  A. H. FAULKNER  2,946,968
MECHANICAL DELAY LINE
Filed Feb. 27, 1958  2 Sheets-Sheet 1

INVENTOR.
ALFRED H. FAULKNER
BY
ATTY.

July 26, 1960  A. H. FAULKNER  2,946,968
MECHANICAL DELAY LINE
Filed Feb. 27, 1958  2 Sheets-Sheet 2

INVENTOR.
ALFRED H. FAULKNER
BY
C. A. Gulbrandsen
ATTY.

United States Patent Office  
2,946,968  
Patented July 26, 1960

2,946,968
MECHANICAL DELAY LINE

Alfred H. Faulkner, Redondo Beach, Calif., assignor to Automatic Electric Laboratories, Inc., a corporation of Delaware Filed Feb. 27, 1958, Ser. No. 717,983

6 Claims. (Cl. 333—30)

This invention relates to a mechanical delay line, and more particularly to a terminating arrangement for delay lines such as, for example, magnetostrictive or liquid delay lines.

The termination of mechanical delay lines to suppress troublesome echo pulses presents some difficulty. In magnetostrictive delay lines signal pulses generated by a transmitter coil will be reflected at both ends of the line, so that a receiver coil spaced from the transmitter coil will pick up two different echo pulses produced by the first reflections as well as several echo pulses from multiple reflections due to a single input pulse. Various arrangements have been proposed for suppressing the echo pulses, such as inserting the ends of the line in beeswax or between damping pads. In another proposed arrangement several elements of different lengths are used to produce noncoherent reflections. In still another arrangement two lines are used in parallel between the input and output, and at each end one line is clamped while the other is left free, so that the first reflections are of opposite phase and produce signals which cancel in the output. However, for some applications none of these arrangements is completely satisfactory because the suppression is not sufficient, or the apparatus is too complex, or for other reasons. In the arrangement using two parallel lines, while the echoes after the first reflections produce signals which cancel in the output they are still present on the respective lines to be reflected and produce additional echoes.

It is a principal object of this invention to provide a mechanical delay line with a simple terminating arrangement having good echo suppression.

It is another object to provide a mechanical delay line which may be conveniently mounted for use in an electronic system.

It is often required that a delay line be adjustable. Therefore, it is another object of this invention to provide an improved arrangement for adjusting the delay time.

According to the principal aspect of the invention, the pulse delay system is provided with a mechanical delay line which is divided at each end into two portions, the end of one portion being terminated in substantially infinite impedance while the end of the other portion is terminated in substantially zero impedance, so that the echoes produced by reflections of a pulse at the two portions will be of opposite phase and therefore will cancel in the main portion of the delay line. The pulse is injected at a suitable input location and is detected at a suitable output location.

In the preferred form of the invention the delay line comprises a magnetostrictive metal tube slit longitudinally at each end to provide two portions, one portion being clamped at the end and the other portion left free. The two portions are preferably equal in length to the reflection point. Input and output coils around the tube are spaced from the respective ends.

To further aid in suppressing the echoes, damping arrangements may be inserted between each end of the line and the input and output points respectively. In the case of a magnetostrictive tubular line, the damping arrangement may take the form of neoprene tubing inserted inside and outside the magnetostrictive tubing.

Another feature of the invention relates to an arrangement for adjusting the delay time of a magnetostrictive line by means of an adjustment bar. In the type of mounting arrangement in which the components are mouted on a card which is plugged into a jack of the equipment, the flat sides of the card may not be accessible. Therefore, according to the invention, the adjustment bar extending parallel to a flat side of the card and having one coil support attached thereto has its end bent across the edge of the card, and this end is fastened to a support block by an adjusting screw which is easily accessible. This provides a continuous fine adjustment. A course step adjustment is provided by several holes in the adjustment bar, with the coil support fastened to the bar by a screw inserted through a selected one of the holes.

The above-mentioned and other objects and features of this invention and the manner of attaining them will be more apparent and the invention itself will be best understood, by reference to the following description of embodiments of the invention taken in conjunction with the accompanying drawings comprising Figs. 1 to 7, wherein.

Figure 1:
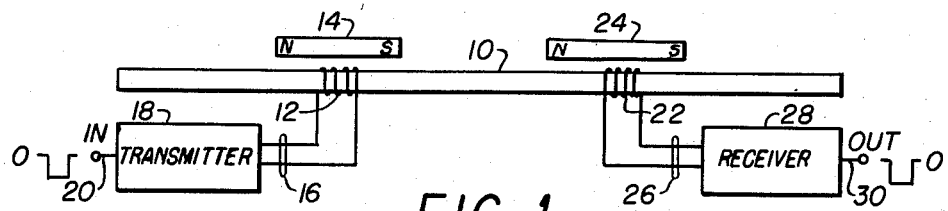
Fig. 1 is a diagrammatic representation of a magnetostrictive delay line system.
Figure 2:
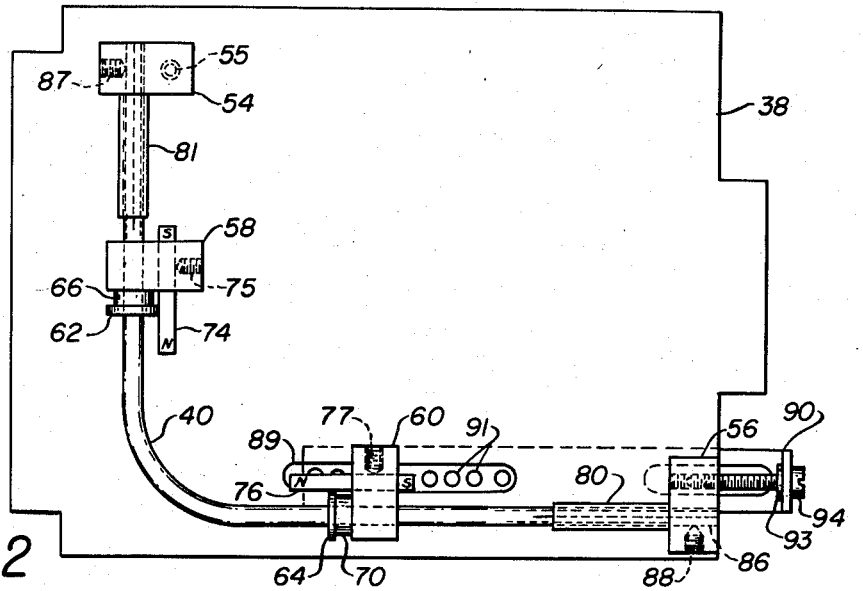
Fig. 2 is a plan view of a magnetostrictive delay line arrangement on a card type mounting board.
Figure 3:
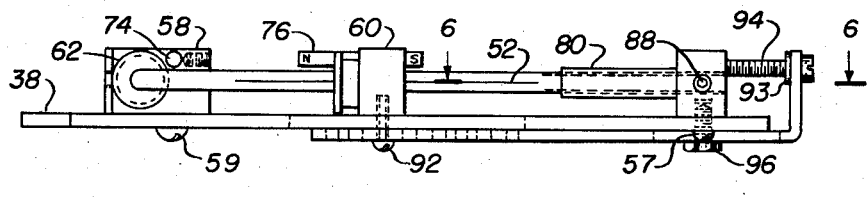
Fig. 3 is a side view in elevation of the arrangement shown in Fig. 2.

Referring to Fig. 1, the usual magnetostrictive delay line system comprises a link of magnetostrictive material 10, which may be in any suitable form such as a ribbon, a rod, or a tube. An input coil 12 is spaced from one end, and an output coil 22 is spaced from the other end. Bias fields are provided, such as by permanent magnets 14 and 24 located adjacent to respective coils 12 and 22. Each magnet may be moved along the length of its coil to the location of maximum sensitivity. An input pulse at terminal 20 is coupled through a transmitter which may be a blocking oscillator, to leads 16 of coil 12. The output pulse from leads 26 of coil 22 is coupled through a receiver to the output terminal 30. The output pulses from output terminal 30 may be recirculated to input terminal 20 to provide a memory device.

Referring now to Figs. 2 to 6, a specific magnetostrictive delay line arrangement is shown which embodies the features of the invention. The arrangement is mounted on a standard card 38, on which additional components may also be mounted, as a subassembly of an electronic system. One use of this delay line is for a memory in a time division multiplex telephone switching system, as described in my copending application for an "Electronic Switching System," Serial No. 707,298, filed January 6, 1957.

The nickel tube delay line 40 is bent at a 90° angle to fit on the card 38. Its ends are mounted in support blocks 54 and 56 respectively. The transmitter coil 66 is wound on a form 62 which is integral with support block 58, and the receiver coil 70 is wound on a coil form 64 which is integral with a support block 60. The permanent magnet 74 is inserted through a hole in block 58 adjacent coil 66 and held in place by set screw 75, and a permanent magnet 76 is inserted through a hole in block 60 adjacent coil 70 and held in place by set screw 77. Blocks 54 and 58 are attached to card 38 by screws 55 and 59 respectively. A longitudinal slit 52 under coil 70, and a similar slit 53 (Fig. 5) under coil 66, prevent eddy current losses.

The line is made of nickel tubing instead of ribbon or small diameter wire because of several advatages. Tubing is a more rugged structural form, and it is self-supporting in moderate lengths and thus does not need to be held under tension. It is easily used with a 90° bend to fit on the card. Another advantage of this L shape is that the transmitting coil 66 and receiving coil 70 have their axes at right angles, thereby minimizing inductive coupling between them. Such coupling could cause difficulty with the coils in such close proximity.

Figure 4:
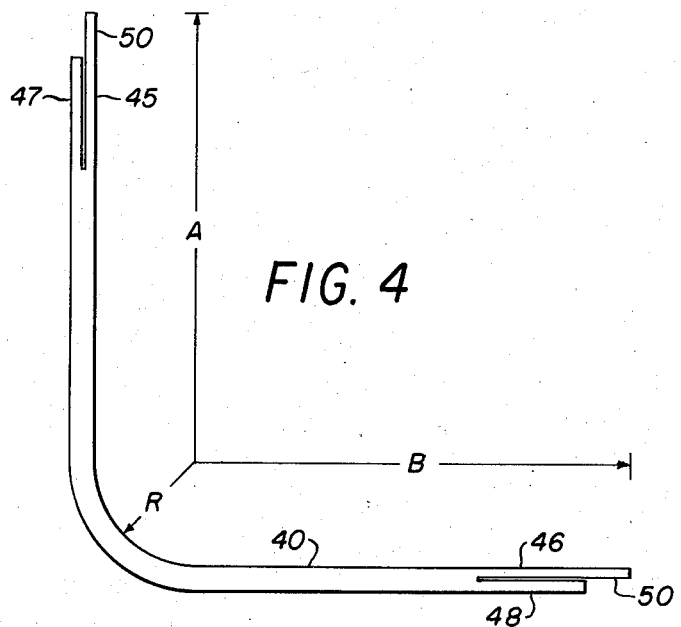
Figs. 4 and 5 are a plan view and a side view showing an end of the magnetostrictive metallic tubing used in the arrangement of Fig. 2.
Figure 5:
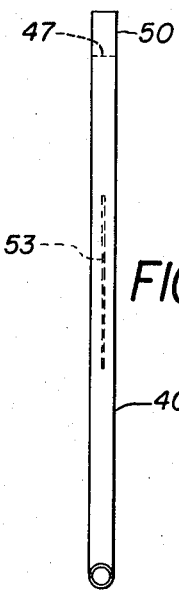
Figure 6:
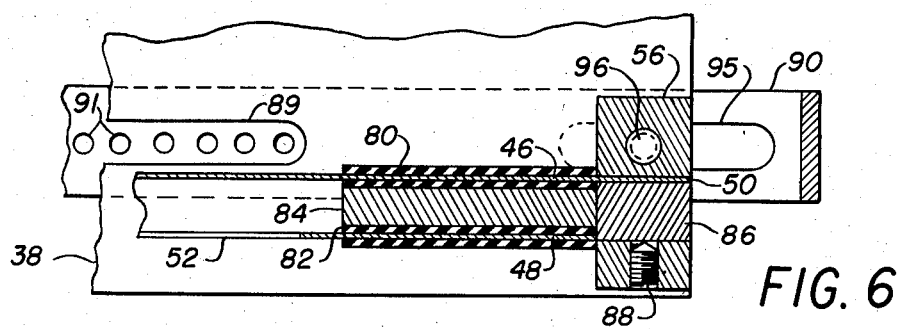
Fig. 6 is a sectional view taken along lines 6—6 of Fig. 3.

The nickel tube 40, shown in Figs. 4 and 5 without the assembly, is slit longitudinally at each end to provide portions 45 and 47 at one end and portions 46 and 48 at the other end. The portions 47 and 48 are cut shorter than portions 45 and 46. As seen best in Fig. 6 a length of neoprene tubing 82 having an outside diameter equal to the inside diameter of the nickel tube 40 is fitted over a metal rod 84 and then inserted into the end of tube 40. Another length of neoprene tubing 80 is then fitted over the outside of tube 40 directly opposite tubing 82. This arrangement serves as the damping device.

A short rod 86 is inserted in the end part 50 of portion 46 which extends beyond portion 48, with the rod 86 and end 50 within a hole of support block 56. A set screw 88 bears against rod 86, which in turn presses against the end 50. Thus the portion 46 is solidly clamped down at its end. The portion 48 is left free at its end. A pulse traveling toward the end of the nickel tube 40 will be reflected without phase reversal by the portion 46 which is solidly clamped, and it will be reflected with phase reversal at the end of the free portion 48. The portions 46 and 48 are equal in length to the respective reflection points. Thus the two reflected pulses, or echoes, tend to cancel out. The pulses are also substantially attenuated by passing between the damping pads 80 and 82. A similar damping and clamp arrangement is used at the end of tube 40 having portions 45 and 47 at support block 54, with the outer neoprene tubing 81 corresponding to tubing 80, and the set screw 87 corresponding to set screw 88 shown in Fig. 2.

To provide for adjustment of the time delay, the receiving coil support block 60 is attached to an adjusting bar 90. This bar is provided with the plurality of holes 91, and a screw 92 is inserted into one of these holes, through a slot 89 in card 38, and threaded into block 60, to provide the course adjustment. A screw 94 is inserted through a hole in the upward extending portion of bar 90, and is held in place by a retaining ring 93. This screw 94 threads into block 56 and is adjusted to position the bar 90, and thereby provide the fine adjustment. After the final adjustment is made, the adjusting bar 90 may be locked in place by a screw 96 inserted through a slot 95 in the bar, through a hole in card 38, and threaded into block 56. The block 56 is also fastened to card 38 by a screw 57 which is threaded into a hole 56 ending below set screw 88.

The arrangement for adjusting the time delay enables the adjustment to be performed while the unit comprising the subassembly on card 38 is in its place in a jack of the complete equipment. The flat sides of the card are then inaccessible, and it is imperative that the adjustment screw 94 be accessible from the edge of the card, as shown.

In a specific embodiment according to Figs. 2 to 6 mounted on a card 38 having overall diamensions of 4¹¹⁄₃₂ in. by 5⁵⁄₁₆ in., the nickel tube 40 has an inside diameter of 0.175 in., an outside diameter of 0.185 in., and a length comprising a dimension A of 2²³⁄₃₂ in., dimension B of 3¹¹⁄₁₆ in., and at the curve an inside radius R of 0.782 in.

The length of each end 50 clamped in the support is ⅜ in. At each end the slit is one inch long measured from the end of the free portion. The inner and outer neoprene tubes have respective cross sections of ³⁄₃₂ in. by ¹⁄₃₂ in. and ³⁄₁₆ in. by ¹⁄₃₂ in.

Figure 7:
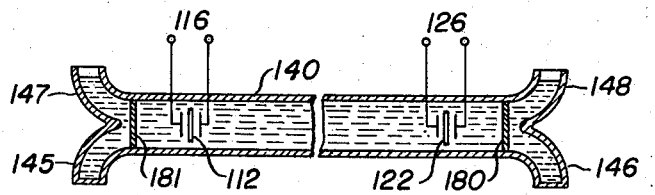
Fig. 7 illustrates the application of the invention to liquid delay lines.

As shown in Fig. 7, the features of this invention may also advantageously be incorporated in a liquid delay line. The liquid delay line 140 is divided at one end into a closed portion 145 and an open portion 147 and at the other end into a closed portion 146 and an open portion 148. Excitation is provided by a piezo-electric crystal 112 connected across input terminals 116, and detection is provided by a piezo-electric crystal 122 connected across output terminals 126. Damping devices are provided in the form of flexible membranes or diaphragms 180 and 181 which may be perforated or not, as desired.

The free ends 47 and 48 of the magnetostrictive line 40, and the open ends 147 and 148 of liquid line 140 provide terminations having substantially zero impedance which reflect pulses with phase reversal. The clamped ends 45 and 46 of magnetostrictive line 40 and the closed ends 145 and 146 of liquid line 140 provide terminations with substantially infinite impedance which reflect pulses without phase reversal.

The operation of the system of Fig. 7 is completely analogous to that of Figs. 2 to 6 and may be understood without further explanation.

While I have described the above principles of my invention in connection with specific apparatus, it is to be clearly understood that this description is made only by way of example and not as a limitation to the scope of my invention.

What is claimed is:

1. A pulse delay system, comprising an elongated tubular element of magnetostrictive material, input means including a coil coupled to the tubular element for generating a signal pulse in said element, output means including another coil coupled to the tubular element for picking up a delayed signal pulse, at least one end of said tubular element being terminated by being slit longitudinally to provide two portions, one portion having a part extending beyond the other portion, a support block having a cylindrical opening, a cylindrical rod and said extended part being inserted in said opening, with means rigidly clamping said extended part of one portion between the rod and the body of the support block and leaving the end of the other portion free so that from the point of division to the respective reflection points the said two portions are of the same length, said arrangement causing the respective echoes produced by reflections of signal pulses from the ends of said portions to coincide in opposite phase after passing beyond said slit.

2. A pulse delay system according to claim 1, wherein said opening in the support block conforms generally to the outer surface of said extended part, said rod conforms generally to the inner surface of the extended part, and said clamping means includes a set screw threaded through the support block and bearing against the rod.

3. A pulse delay system according to claim 1, wherein said coils are coaxial with said tubular element, and the element is bent at a section intermediate the coils so that the axes of the coils are perpendicular to each other.

4. A pulse delay system according to claim 1, wherein both ends of said tubular element are similarly slit and clamped in respective support blocks.

5. A pulse delay system according to claim 4, further including damping means adjacent each end comprising resilient material in tubular form inside and outside of said delay line.

6. A pulse delay system according to claim 4, further including a flat mounting board to which said support blocks are attached, an adjusting bar having a first part generally parallel to said board and a second part extending across an edge of the board, means mechanically connecting one of said coils to said first part, a screw having its axis generally parallel to said board attached to said second part and threaded into a block connected to said board so that turning said screw in either direction causes said one coil to move along said delay line in a corresponding direction.

References Cited in the file of this patent

UNITED STATES PATENTS

| | | |
|---|---|---|
| 2,565,469 | Bradburd | Aug. 28, 1951 |
| 2,760,165 | Sullivan | Aug. 21, 1956 |
| 2,846,654 | Epstein et al. | Aug. 5, 1958 |

FOREIGN PATENTS

| | | |
|---|---|---|
| 667,218 | Great Britain | Feb. 27, 1952 |

OTHER REFERENCES

"Magnetostrictive Delay Line," by E. M. Bradburd, published in Electrical Communication, March 1951, pages 46–53.